United States Patent [19]

Burge

[11] 4,170,918

[45] Oct. 16, 1979

[54] THEFT-PREVENTION SCREW FASTENING

[76] Inventor: William G. Burge, 955 Seven Hills Ranch Rd., Walnut Creek, Calif. 94596

[21] Appl. No.: 846,436

[22] Filed: Oct. 28, 1977

[51] Int. Cl.² .............................................. B25B 15/00
[52] U.S. Cl. ...................................... 85/32 R; 85/45; 81/90 C; 145/50 A
[58] Field of Search ................. 85/32 R, 45; 81/90 C, 81/71, 121 R; 145/50 A; 70/229, 236

[56] References Cited

U.S. PATENT DOCUMENTS

| | | | |
|---|---|---|---|
| 1,447,564 | 3/1923 | Norlund et al. | 85/32 R |
| 2,316,695 | 3/1943 | Jaffa | 85/32 R |
| 2,372,269 | 3/1945 | Golan | 85/45 |
| 3,241,408 | 3/1966 | McCauley | 85/32 R |
| 3,320,783 | 5/1967 | Kerr | 70/363 X |
| 3,821,975 | 7/1974 | Haker | 85/45 X |
| 4,027,572 | 6/1977 | Burge | 85/32 R |

Primary Examiner—Roy D. Frazier
Assistant Examiner—Peter A. Aschenbrenner
Attorney, Agent, or Firm—John Walker

[57] ABSTRACT

A nut or bolt which requires a special tool for its removal. The engaging elements of the nut or bolt and the manipulating tool consisting of matching spline ways and pins which function as splines, the matching elements being arranged in random pattern.

7 Claims, 5 Drawing Figures

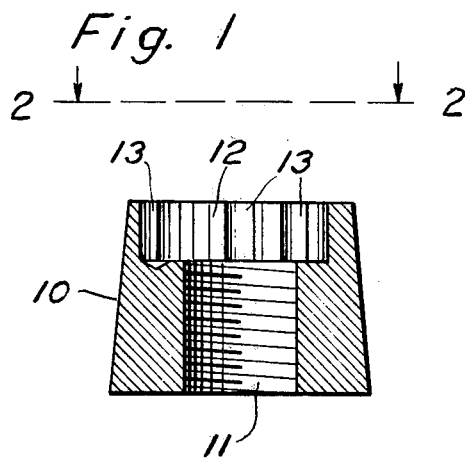
Fig. 1
Fig. 2
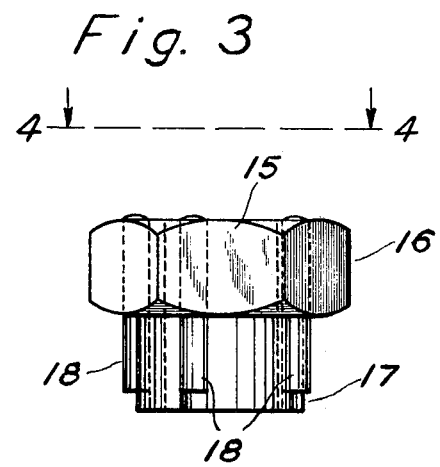
Fig. 3
Fig. 4
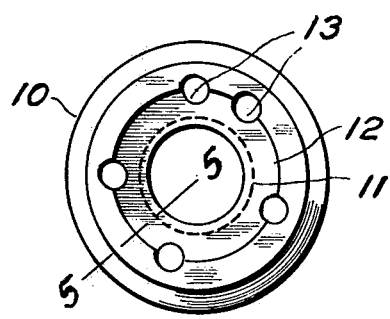
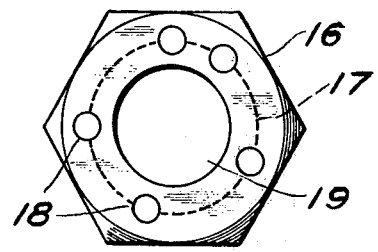
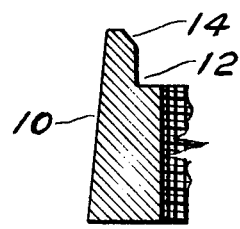
Fig. 5

THEFT-PREVENTION SCREW FASTENING

BRIEF SUMMARY OF THE INVENTION

The need for a fastening means as herein disclosed has long been recognized, and while several designs of such means has resulted therefrom, the methods used to nullify their effectiveness is also on the increase. Of special importance is the necessity for providing a design which will be proof against the use of pipe or stilson wrenches for its removal, and which also will offer little chance of being forced by the impact of a chisel or punch. It is especially for these reasons that the presently disclosed design is considered as a worthwhile improvement over that as illustrated and described in my U.S. Pat. No. 4,027,572.

It is an object of the present invention to provide a fastening means of the type disclosed which will be complete in itself and does not depend upon an outer bushing which can be crushed by the application of heavy duty pliers, bolt cutters and the like.

A further object of the invention is the provision of a nut or bolt which will afford little chance for removal by the aforesaid impact method.

Another object of the invention is the provision of a combination which can be produced at a price which will make it commercially acceptable.

These and other objects of the invention will become apparent during the course of the following description and appended claims taken in connection with the accompanying drawing forming a part hereof.

BRIEF DESCRIPTION OF THE DRAWING.

FIG. 1 is a longitudinal section of the nut of my design.

FIG. 2 is a plan view of the nut as seen from line 2—2 of FIG. 1.

FIG. 3 is an elevation of the driving tool of the combination.

FIG. 4 is a plan view of the tool as seen from line 4—4 of FIG. 3

FIG. 5 is a fragmentary section of the nut taken on line 5—5 of FIG. 2.

Referring to the drawing in detail, the body of the nut 10 is of frusto conical configuration, having a conventional, centrally located threaded aperture 11, and being provided with a counterbore 12 in the upper end thereof. Extending longitudinally downward on the curved surface of the counterbore 12 is a plurality of semi-circular spline ways the centers of which coincide with the circumferance of said counterbore. As can be seen on FIG. 2, there is no uniformity of spacing of the spline ways. They are randomly spaced, such spacing varying with each complete set of nuts.

As illustrated by FIG. 5, the edge of the counterbore 12 has been beveled as indicated by 14. Such beveling removes the sharp corners resulting from the cutting of the spline ways in the counterbore, making it increasingly difficult to apply a punch or chisel at these points. This detail has been omitted from FIGS. 1 and 2 in order to avoid this feature being considered as a completely applicable limitation. Case hardening of the nut body 10 is considered as a further preventive measure against the application of wrenches or pliers to its tapered surface.

Referring now to FIGS. 3 and 4, which illustrate a nut-manipulating tool 15, it will be seen that it consists of an upper hexagon portion 16, and a subtended boss 17. This boss is dimensioned to fit closely into the counterbore 12 of the nut 10. As illustrated on the aforesaid FIGS. 3 and 4, a number of holes have been drilled into the tool 15 into which pins or splines 18 have been tightly driven. These splines are complimentary to the spline ways 13 of the nut 10, in number, pitch circle and radial degree of orientation. The end of the boss 17 preferably extends beyond the ends of the pins, thereby facilitating the application of tool to the nut.

While the tool 15 has been illustrated as having a central bore 19, adapted to fit closely over a screw or stud utilizing such nuts, there will be applications where the provision of this bore will not be necessary, such as when this design is applied to a bolt head.

The improvement of the present design over that disclosed by U.S. Pat. No. 4,027,572 consists of the following:

The nut is self contained in a single unit.

The spline ways 13 end at the bottom of the counterbore 12 which means that individual pins for unauthorized manipulation of the nut can not be supported.

The small space between the inside of the counterbore and the outside of a bolt or screw, furnished with the present design of nut, makes it practically impossible to apply a punch or chisel at an angle of attack which would prove effective.

From the foregoing it should be apparent that I have provided an improved fastening of the type described, while still retaing all of the desirable features of my prior design. While I have illustrated and described a preferred embodiment of my invention, it will be understood that modifications may be made within the spirit and intent of Title 35, United States Code, Section 112, Paragraph 3.

I claim:

1. A nut-manipulating means consisting of a wrench having a circular boss on one end thereof, a plurality of pins mounted on said boss in key and keyseat relationship therewith, said pins being spaced around the exterior curved surface of said boss in a random pattern, the longitudinal straight edges of the limits of the contiguous surfaces of that portion of said pins with the boss of said wrench being parallel and being substantially coincident with the plane of maximum resistance to longitudinal shear of said pins, said pins extending beyond the upper portion of said boss whereby transverse shear resistance is a further potential provision.

2. A nut-manipulating means as in claim 1 wherein said boss extends beyond the lower ends of said pins thereby effecting easy application of said means.

3. The combination of a nut manipulating means as in claim 1 and a screw fastening device comprising a body of frusto conical configuration having a coaxial, annular recess in the upper end thereof, said recess being adapted to receive the circular boss of said nut manipulating means in closely fitting relationship, and having a plurality of spline ways of unform cross section spaced around and extending longitudinally throughout the curved surface of the annular recess of said boss, and being of a random pattern relative to the angularity of their spacing, and being so constructed and arranged as to engage the pins of said nut manipulating means in rotary motion transmitting relationship.

4. A screw fastening device as in claim 3, wherein the upper edge of said recess is beveled.

5. A screw fastening device consisting of a body of frusto conical configuration having a coaxial, annular recess in the upper end thereof, and having a plurality of spline ways of uniform transverse cross section spaced around and extending longitudinally throughout the depth of the curved surface of the annular recess of said boss, and being of a random pattern relative to the angularity of their spacing.

6. A screw fastening device as in claim 5, wherein said frusto conical body has a centrally disposed threaded aperture.

7. A screw fastening device as in claim 5, said frusto conical body has a threaded extension adapted to form a bolt.

* * * * *